Dec. 15, 1953 A. R. LINDSAY 2,662,793
REAR-END CONSTRUCTION OF SELF-SUPPORTING
AUTOMOBILE BODIES
Filed May 27, 1948 6 Sheets-Sheet 2

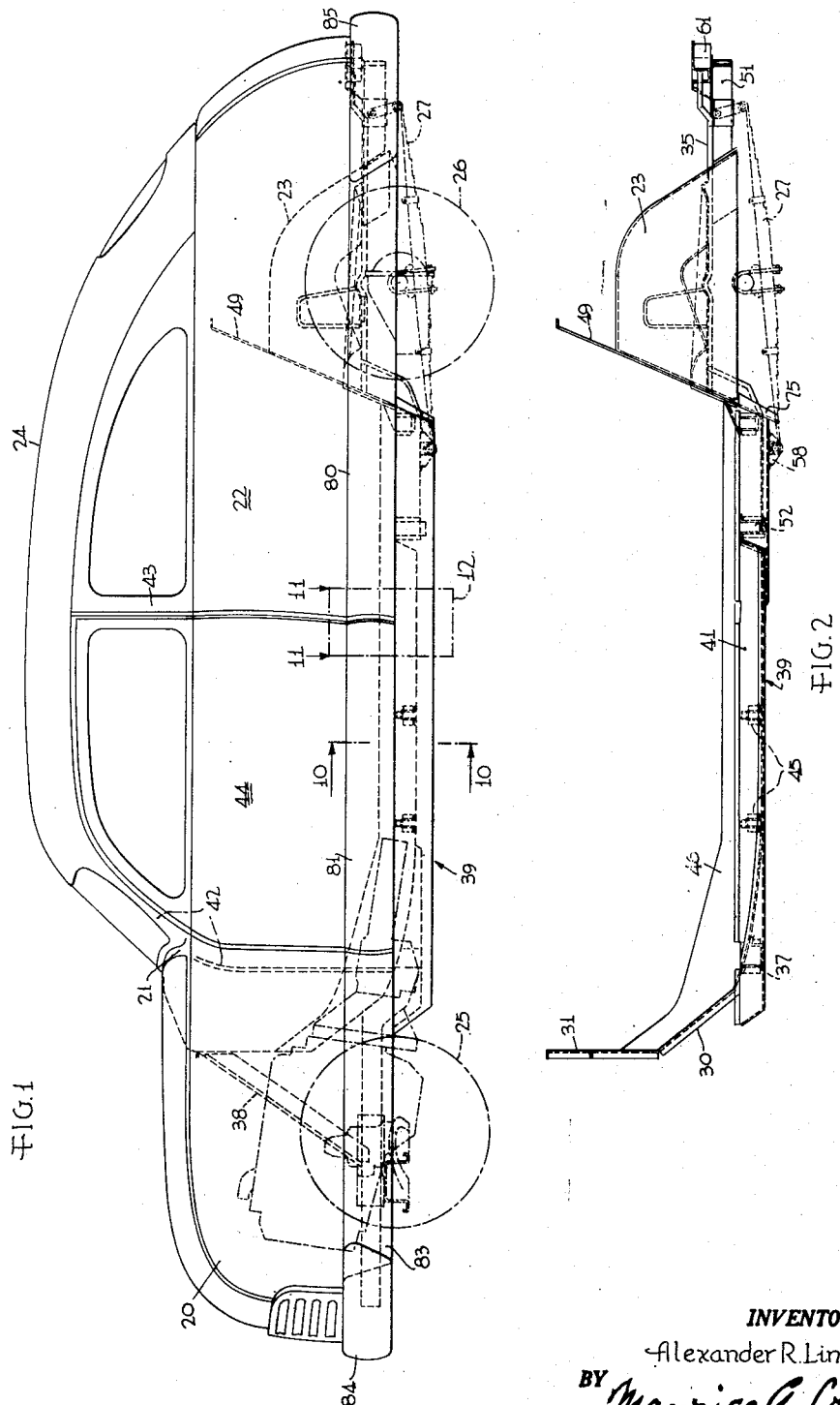
INVENTOR.
Alexander R. Lindsay
BY Maurice G. Crews
ATTORNEY

INVENTOR.
Alexander R. Lindsay
BY *Maurice G. Crews*
ATTORNEY

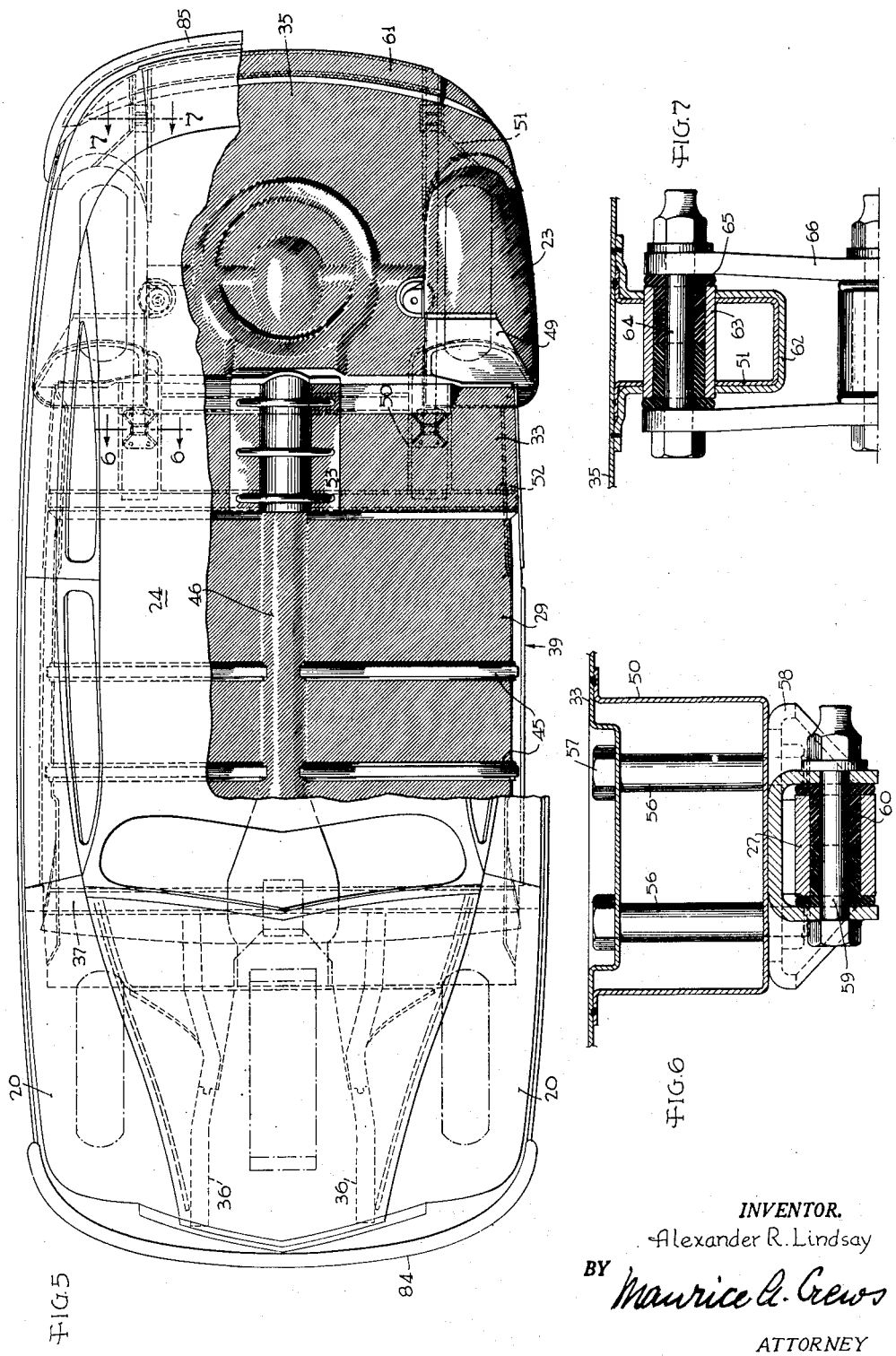

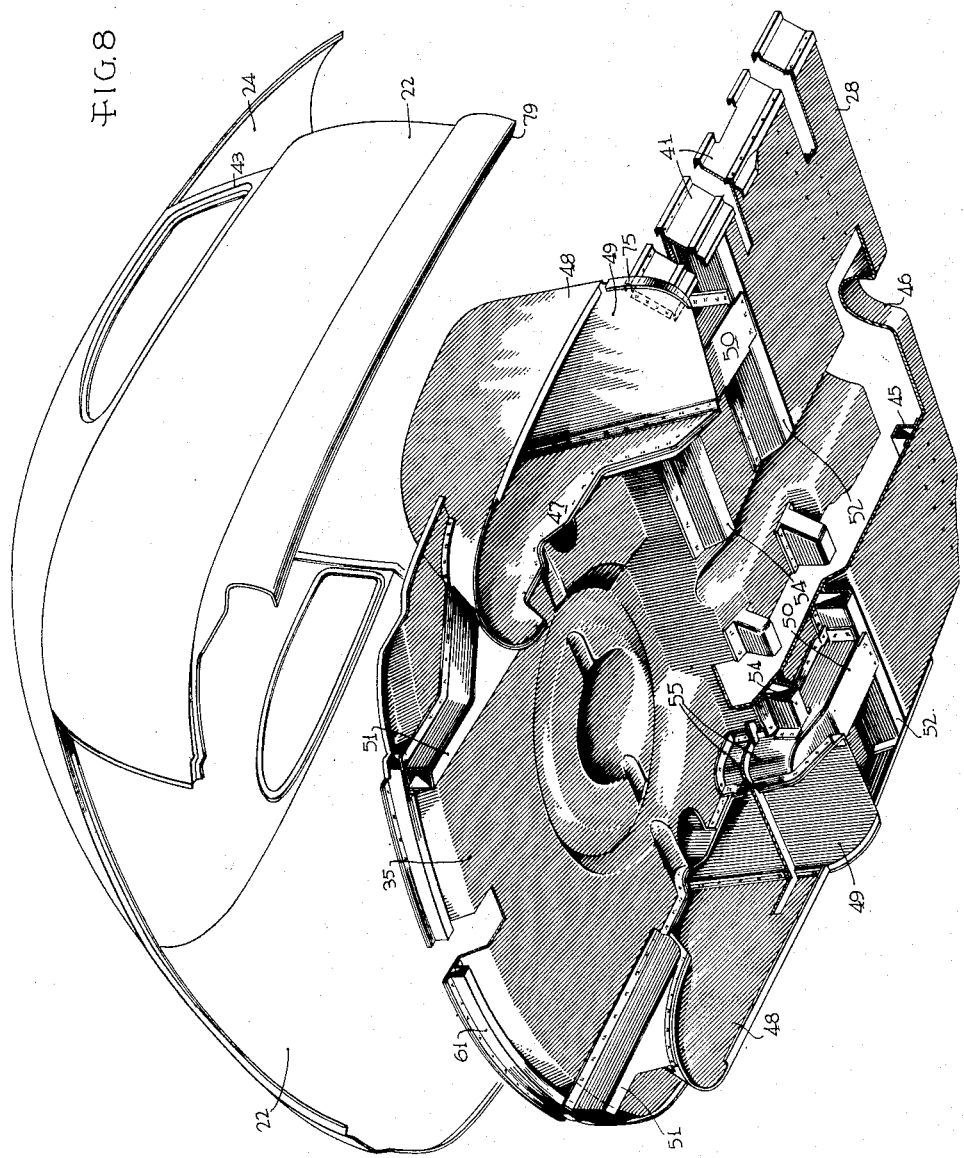

Dec. 15, 1953     A. R. LINDSAY     2,662,793
REAR-END CONSTRUCTION OF SELF-SUPPORTING
AUTOMOBILE BODIES
Filed May 27, 1948     6 Sheets-Sheet 5
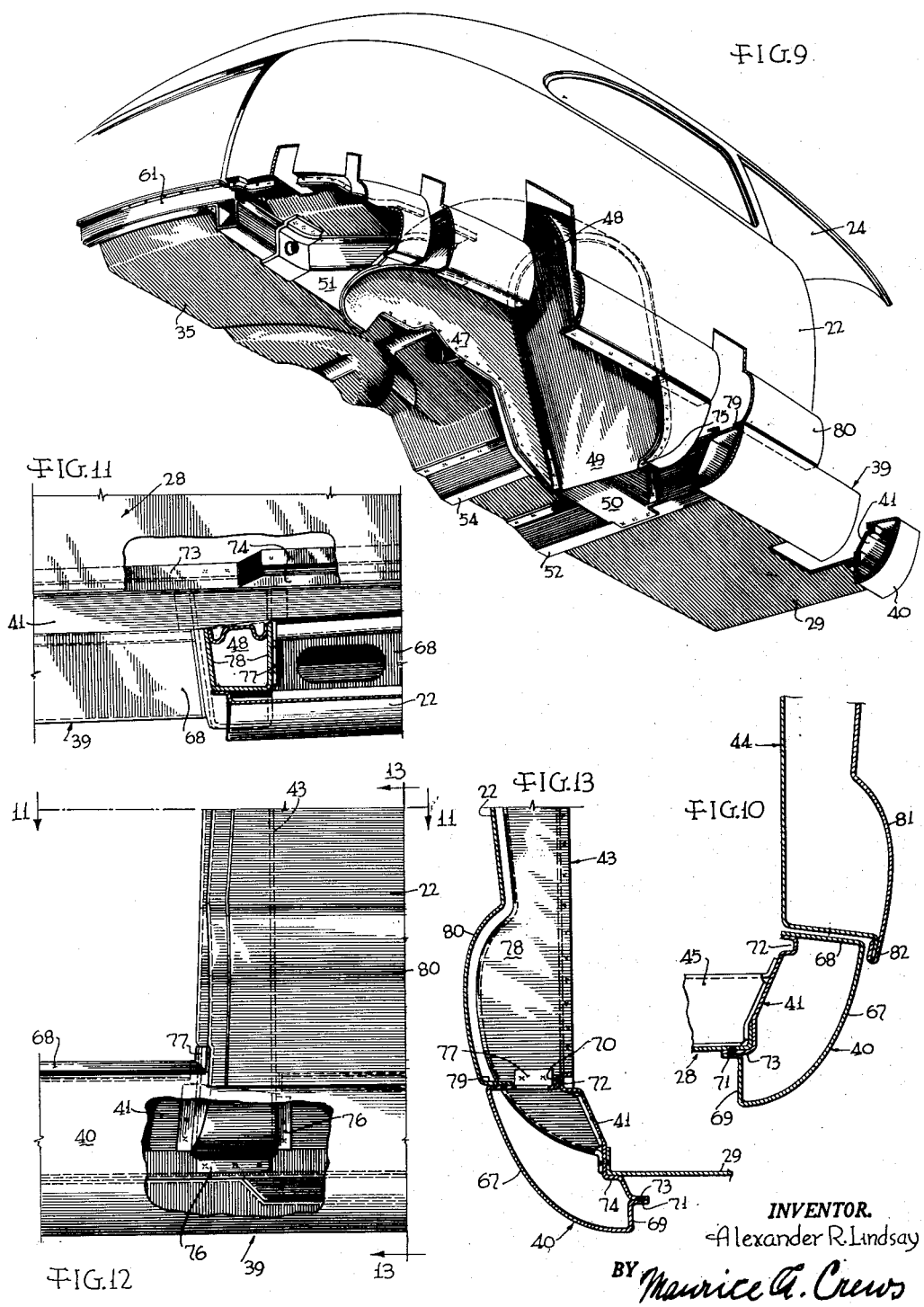
INVENTOR.
Alexander R. Lindsay
BY Maurice A. Crews
ATTORNEY Dec. 15, 1953

A. R. LINDSAY 2,662,793

REAR-END CONSTRUCTION OF SELF-SUPPORTING
AUTOMOBILE BODIES

Filed May 27, 1948

INVENTOR.
Alexander R. Lindsay

BY Maurice A. Crews

ATTORNEY

Patented Dec. 15, 1953

2,662,793

UNITED STATES PATENT OFFICE 2,662,793

REAR-END CONSTRUCTION OF SELF-SUP-
PORTING AUTOMOBILE BODIES

Alexander R. Lindsay, Detroit, Mich., assignor to
The Budd Company, Philadelphia, Pa., a cor-
poration of Pennsylvania Application May 27, 1948, Serial No. 29,457

14 Claims. (Cl. 296—28)

1

The invention relates to a self-supporting body or to a combined chassis and body underframe structure for automobiles.

More particularly, the invention relates to the indicated type of structure for automobiles of the private-passenger-car type.

Among the objects of the invention is such a formation of the rearward portion of an automobile body and particularly of the underframe thereof which combines great width of the body with simple, inexpensive and effective means for reinforcing the body in the rear wheel region and for the attachment of the springs for the rear axle.

Among the objects of the invention, furthermore, is a body which is easy to manufacture, which is strong and durable yet light of weight and in which the stresses from the springs are effectively distributed into a large area of the underframe or body structure so as to avoid any objectionable destructive stress concentration.

The aforesaid and other objects and advantages of the invention are achieved by the novel provision, formation and arrangement of parts which will be easily and completely understood from the embodiments described in detail hereinafter and illustrated in the attached drawings.

In the drawings,

Figure 1 is a side elevation of an automobile embodying the features of the invention;

Figure 2 is a side elevation of the underframe unit forming part of the body illustrated in Figure 1;

Figure 5 is a plan view of the body shown in Figure 1, part of the body superstructure being broken away to afford a plan view of the understructure;

Figures 6 and 7 are fragmentary sections along the correspondingly numbered lines of Figure 5 on a larger scale;

Figure 8 is a fragmentary partially sectional perspective view of the body underframe unit and the body superstructure;

Figure 9 is a view corresponding to Figure 8 showing underframe and superstructure in final assembly;

Figure 10 is a fragmentary section on a larger scale through threshold and lower margin of the door taken along line 10—10 of Figure 1;

2

Figure 3:
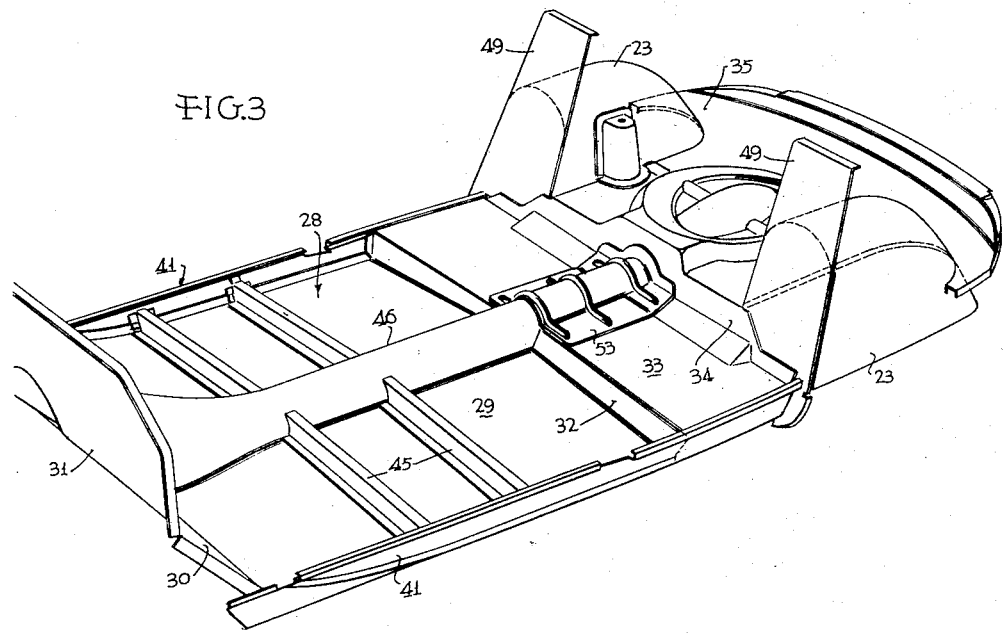
Figure 3 is a perspective three-quarter front view of the underframe unit shown in Figure 2.
Figure 4:
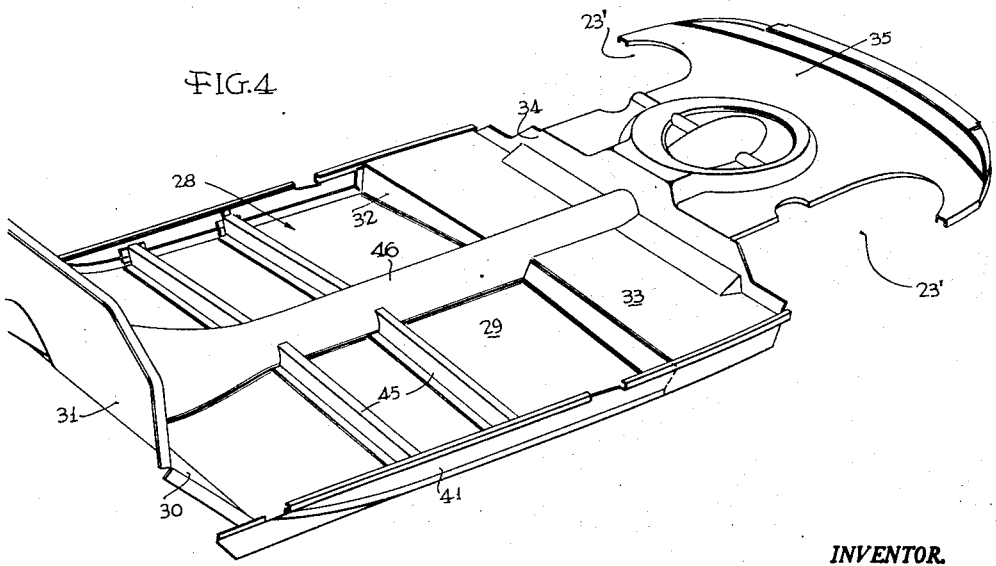
Figure 4 is a view similar to Figure 3, certain parts, particularly the rear wheel housings, being omitted to illustrate the extent and the outline of the floor panel.
Figure 14:
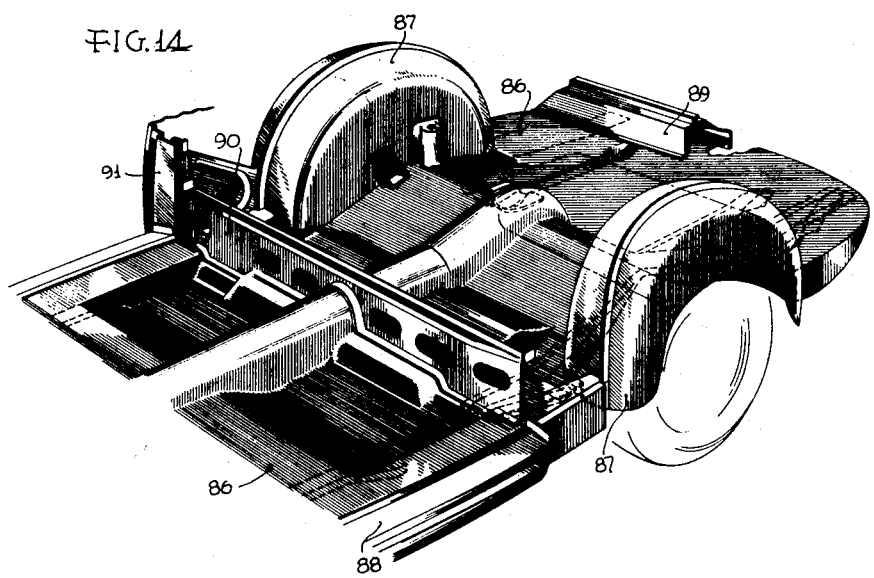
Figure 15:
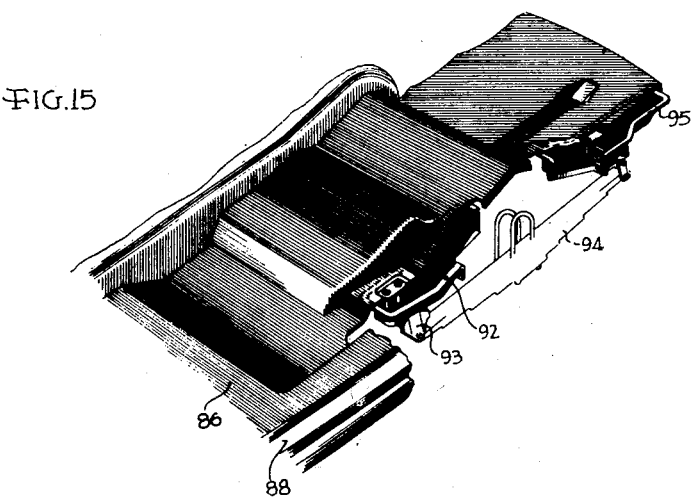

Figure 11 is a horizontal fragmentary section on the scale of Figure 10 along the line 11—11 of Figures 1 and 12 showing the body in the region of the rear door post without the adjoining portion of the door;

Figure 12 is a larger scale side elevation of the body portion surrounded by line 12 of Figure 1, the outer threshold panel being partly cut away and the door being omitted;

Figure 13 is a fragmentary section along line 13—13 of Figure 12 with the outer body panels shown in place;

Figure 14 is a fragmentary perspective view of the rear end of a body underframe and adjoining body parts built in accordance with a second embodiment of the invention; and Figure 15 is a perspective view of certain parts of Figure 14, some parts being omitted or shown in section to illustrate the underlying structure.

The automobile diagrammatically illustrated in Figure 1 is of the type which acts as its own chassis, or in which at least the body underframe and the chassis frame are combined into one single structure. While the invention is mostly concerned with the combined chassis and underframe structure, it is worth mentioning that preferably the upright portions of the body walls, including the front fenders and wheel housings 20, the cowl 21, the rear quarter panels 22 and the rear wheel housings and fenders 23 as well as the roof 24, form an integral structure with the underframe and, together with the latter, serve for sustaining and transmitting all stresses. This unitary structure is supported on the front and rear wheels 25, 26 by means of springs, of which only the rear springs 27 are shown.

The chassis and body underframe structure illustrated in Figures 1 to 13 comprises a floor panel 28 having a middle portion 29, and it is extended at the front by the toeboard 30 and the dashboard 31. In rear of the middle portion 29, the floor panel has an offset 32 at the location of the front margin of the rear seat (not shown), a raised portion 33 under the rear seat, another upwardly and rearwardly inclined offset 34 along the rear margin of the rear seat and a further raised portion 35 extending between and beyond the rear wheel housings 23 to the rear margin of the body. The panel portions 33, 34 and 35 define cutouts or recesses 23' at the wheel locations.

At the front, the underframe structure is continued by sill members 36 (Figure 4) tied into the toe- and dashboards and an underfloor cross member 37 and is reinforced by the front wheel housings and fenders 29 as well as by inclined braces 38 (Figure 1). This front end construction of the body is more clearly described in and forms the subject matter of the inventor's application Serial No. 29,458, entitled "Self-Supporting Bodies for Automobiles," filed May 27, 1948, simultaneously with the present application. However, it should be understood that a rear end construction of the body built in accordance with the present application may be used together with front end constructions different from those disclosed here and in said simultaneous application.

Certain features disclosed here form the subject matter of applicant's co-pending application Serial No. 198,276, entitled "Sill and Post Structure for Automobile Bodies," filed on November 30, 1950, as a division of the present application.

Between the dash- and toeboards and the rear wheel housings, the floor panel portions 29, 32, 33 are provided with marginal reinforcements or side sill structures 39 (Figures 9 to 11) each comprising an outer panel member 40 and an inner member 41 connected along their margins to form a box section. The sills 39 are connected with the margins of the floor panel 28. The sides of cowl 21 and the rear quarter panels 22 are secured to the tops of the sill members 40 and to the posts 42 and 43. The construction, joinder and arrangement of posts, sills, quarter panel, door 44 and floor will be described more in detail later on.

The front ends of the sills are interconnected by the aforesaid cross members 37 (Figure 2) and in the front seat region by transverse members 45 secured to the top of the floor panel. A tunnel 46 is provided along the center line of the floor panel 28 for the drive shaft (not shown).

In the rear, each wheel housing 23 consists of inner and outer stampings 47, 48 (Figure 8) and on the inboard end, of an inclined transverse wall or web 49 which presents a support for the back of the rear seat in combination with the aforesaid offset 34 and an X-brace (not shown). The wheel housing stampings are joined together along their meeting margins, preferably by electric spot welding. Along or near their lower inner margins the stampings are connected with the margins of the floor panel and along their lower outer margins with the outer margins of the rear quarter panels 22.

The front wheel housings are constructed similarly to the rear wheel housings as stress transmitting and load sustaining structures. Their inboard wall is formed by dash- and toeboard to which are secured the inner wall of the wheel housing (not shown) and the outer wall which is visible in the drawing. The details of the construction of the front wheel housing are disclosed in and form the subject matter of applicant's above cited simultaneously filed application.

It will be understood that the wheel housings are structurally tied into the remainder of the underframe and body structure and form important load sustaining and stress transmitting elements of the structure. They represent, in effect, hollow beams extending to the rear and to the front marginal sill structures 39 connected with the floor panel between the front and rear wheel housings. Furthermore, it will be understood that in the illustrated embodiments there is no other sill or beam extending the side sill structures 39 to the rear end of the body save the members now to be described, which constitute an outstanding feature of the invention.

Ordinarily, as in customary chassis frames, the ends of the longitudinal leaf springs are arranged beneath or close to the chassis side sills and are secured thereto by means of brackets and shackles. In a combined body and chassis construction of present day design, the tying of longitudinal leaf springs into the side sills becomes a problem inasmuch as the side margins of the body are arranged close to or even outwardly beyond the planes of the outer surfaces of the wheels, whereas the springs are arranged inwardly of the wheels. In other words, there is a wide space between the side margins of the body and the ends of the longitudinal leaf springs.

So as to provide attachment points for the springs, trough- or hollow-section members 50, 51 are secured to the underside of the floor pan 28 in front and in rear of the rear wheel housings. The members 50, 51 form with the floor panel closed box sections.

The front members 50, at the front, are tied into a cross brace structure 52 which may consist of two members interrupted by the tunnel 46 but interconnected on the top of the floor panel by a reinforcing stamping 53 (Figure 5). The transverse brace structure 52 has its ends secured to the side sill structures 39 (Figure 9). The members 50 are further secured to a second cross brace structure 54 which is likewise interrupted at the tunnel region and tied into the reinforcing stamping 51. The rear end of each member 50 is provided with a rearwardly and upwardly projecting horn 55 (Figure 8) which hugs the crown 49 and the inside of the wheel housing as well as the offset 34 of the floor panel to which it is structurally secured.

The structures 50 are interiorly reinforced by brackets or bushings 56 (Figure 6) for bolts or rivets 57, the latter holding a bracket 58 to which the front end of the respective rear spring 27 is attached in any appropriate or conventional manner. In the drawing, this connection is illustrated as consisting of a pin or bolt 59 surrounded by a rubber bushing 60, the latter being encased in the loop-formed end of the spring 27.

The rear members 51 have their front ends widened (Figures 8 and 9) so as to embrace the crown and part of the inside of the wheel housing while their rear portions are narrow and intersect the rear cross member 61 which is secured to a rear marginal offset of the floor panel 28. The member 51 is locally reinforced by a hat section member 62 (Figure 7), and both members are provided with a bushing 63 for the reception of a pin 64 and a rubber sleeve 65 for shackle 66 holding the rear end of the spring 27, Figure 7.

To permit a good connection between the wheel housings 23 and the members 50 and 51 as well as connection between the wheel housings 23 and the rear ends of the side sills 39, the wheel housings in the respective regions extend downwardly beyond the level of the floor panel, as clearly shown in the drawing.

In the illustrated construction, all stresses transmitted from the ends of the springs into the body are distributed through the members 50, 51, the adjoining floor panel portions, cross braces and wheel housings over large areas of the body walls so that the danger of stress concentration is avoided. The construction is very light due to the absence of continuous side sills in the rear region of the body. The transmission of vibrations is prevented by the rubber bushings or sleeves 60 and 65.

The details of the threshold and its connection with posts and side wall panels, as well as its arrangement relative to the door, are most clearly illustrated in Figures 8 to 13.

The side sill or threshold 39 on each side of the body has its outer stamping 40 of inwardly facing channel section provided with merging outer and bottom walls 67, inwardly directed top wall 68 and a narrow lower inner vertical wall extension 69. In the regions of the cowl and the rear quarter panel, the inner margin of the wall 68 has an upwardly directed flange 70. The wall extension 69 has an inwardly projecting flange 71 throughout its length. Inner sill member 41 is inserted between the margins of the walls 68 and 69 of the outer member and has an upper inwardly facing channel portion 72 to the upper wall of which the inner margin of the wall 68 is secured in the threshold region, and the vertical wall of which is secured to the vertical flange 70 of wall 68 in the regions of cowl and rear quarter panel 22. A flange 73 along the lower margin of wall 41 is overlappingly secured to flange 71 of wall extension 69.

In the region of the door opening, the floor panel 28 rests on and is secured by spot welding to the overlapping flanges 71 and 73 of the sill. In this region, it is easy to reach through the door opening to effect spot welds. In the region remote from the door opening, such as illustrated in Figure 13, the floor panel rests on and is secured to a ledge 74 of the sill member 41 which has its flange 73 in this region offset downwardly below the floor panel. With this arrangement, it is possible to connect the flanges 73 and 71 in the regions away from the door opening by use of welding tools which do not require reaching into the interior of the body; furthermore, floor panel and inner sill member may be assembled in a first operation to form the unit illustrated in Figures 3 and 4, and then such unit may be connected with units each comprising a rear quarter panel 22 and an outer threshold or sill member 40.

The rear ends of the box sectional thresholds are closed by the panels 49 which, for connection to the threshold walls 66, are flanged at 75 (Figure 9). Through openings in the top wall 68 the rear or lock pillars 43 extend into the interior of the thresholds 39 (see Figures 12 and 13) and are secured to the walls 41 by flanges 76 bent off from the walls of the pillars. Transverse flanges 77 formed along the margins of the openings on the walls 68 overlap the side walls 78 of the pillars and are secured thereto. The front pillar connection (not shown) may be similar.

By means of inwardly directed flanges 79, the rear quarter panels 22 overlap the top walls 68 and are secured thereto. These panels and the doors 44 have beadings 80, 81 formed along their lower margins. The overlap flange 82 of the door is outwardly offset relative to the outer surface of the sill 39 so that no fitting of the door and sill surfaces is required. The front wheel housing 20 has a similar beading 83. The beadings 80, 81, 83 are arranged in continuation of each other and adjoin the front and rear bumpers 84, 85. This arrangement gives the impression that the car is terminated by the lower horizontal margin of the body.

The embodiment illustrated in Figures 14 and 15 differs from the first embodiment mainly in the form and arrangement of the members serving for the attachment of the rear springs and in the form and arrangement of the cross braces serving for the transmission of the stresses from those members into the remainder of the body. The second embodiment has a floor panel 86, rear wheel housings 87, side sill structures 88, a rear cross member 89, and a rear seat riser 90 interconnecting side wall posts 91.

The underframe is provided on each side with a forward reinforcing member 92 carrying the front attachment brackets 93 for the springs 94. Each of these members extends from the front of the respective wheel housing forwardly to a region underneath the seat riser 90. The members 92 are of upwardly facing channel form provided along their margins with flanges for securement to the floor panel and to downwardly extending front portions of the wheel housings, and they are closed at the front.

The rearward spring attaching members 95 are very similar to the corresponding members of the first embodiment. They also are channel sections with marginal flanges for securement to floor panel and downward extensions of the wheel housings. At the rear, the members 95 intersect the rear cross brace 89 which is secured to and projects upwardly beyond the top of the floor panel.

The drawings indicate clearly that the illustrated structures consist of sheet metal stampings and that the component sheet metal parts are overlappingly secured to each other by electric spot welding. Also, it is apparent that the margins of the different parts are flanged for this purpose. It is believed not necessary to describe in detail each of these overlapping connections and each of the flanges. While certain parts are described for or shown on only one side of the longitudinal middle line of the body, the body, in most places, is symmetrical to the middle line; consequently, showing and describing both sides would serve no useful purpose.

It is to be understood that the invention to be covered by this application is not restricted to the embodiments illustrated in the drawing and described hereinbefore but that it is subject to many modifications and adaptations. For example, the invention or certain features thereof may be employed at the front end of a vehicle, or the invention may be used in automobile bodies in which only the inner portions of the wheel housings form integral parts of the body structures, whereas outer portions are formed by fenders which are removably secured.

What is claimed is:

1. In a combined body floor and chassis frame structure for automobiles, a floor panel extending between and fore and aft beyond recesses for a pair of rear wheels, a wheel housing structure on each side of the panel secured by its lower marginal portions to the margins of the panel defining the recess, a transverse beam being forwardly appreciably spaced and a second transverse beam being rearwardly appreciably spaced from said wheel housing structures, both beams extending to the outer margins of the floor panel and being secured to the latter, longitudinally extending short hollow section members arranged inwardly of the outer margins of and secured to the floor panel, said members extending between and being overlappingly secured to those sides of said wheel housing structures and said transverse beams which are adjacent and face each other, said members being substantially restricted to the space between the end regions of said wheel housing structures and the respective adjacent transverse beams, and means on said members for the attachment of the ends of longitudinal leaf springs connected with the wheels in said wheel housing structures, the marginal portions of said floor panel together with said wheel housing structures and hollow section members constituting the sole lateral sill structures of the frame structure in the region of said wheel housing structures.

2. In a combined body floor and chassis frame structure for automobiles, a floor panel extending between and fore and aft beyond recesses for a pair of rear wheels, a wheel housing structure on each side of the panel secured by its lower marginal portions to the margins of the panel defining the recess, a transverse beam forwardly spaced an appreciable distance from said wheel housing structures and extending to the outer margins of the floor panel and secured to the latter, longitudinally extending hollow section members arranged inwardly of the outer margins of and secured to the floor panel, said members extending between and being overlappingly secured to said wheel housing structures near the front of the latter and said transverse beam while leaving the major part of the wheel housing structures free, said members terminating substantially at said first-named transverse beam, a second transverse beam arranged in rear of said first-named beam extending between and being secured to said members, and means on said members for the attachment of the ends of longitudinal leaf springs connected with the wheels in said recesses.

3. In a combined body underframe and chassis frame structure for automobiles having recesses for rear wheels surrounded by said structure on the front, the inside and the rear, side sills ending at the front of the rear wheel recesses, a floor panel interconnecting said sills and extending between and rearwardly of the rear wheel recesses, wheel housings structurally secured along their lower margins to said floor panel, upwardly facing elongated hat section members secured by their marginal flanges to the underside of said floor panel in the longitudinal region of the insides of the wheel housings, one of the ends of said members embracing and being secured to corner portions of said wheel housings projecting downwardly beyond said floor panel, said members being adapted for connection to the ends of longitudinal leaf springs for supporting the wheels.

4. In a combined body underframe and chassis frame structure for automobiles having recesses for rear wheels surrounded by said structure on the front, the inside and the rear, side sills ending at the front of the rear wheel recesses, a floor panel interconnecting said sills and extending between and rearwardly of the rear wheel recesses, wheel housings structurally secured along their lower margins to said floor panel, upwardly facing elongated hat section members secured by their marginal flanges to the underside of said floor panel in the longitudinal region of the insides of the wheel housings, one of the ends of said members embracing and being secured to the lower corner portions of said wheel housings, said corner portions projecting downwardly beyond said floor panel, a pair of transverse beams secured to said floor panel at a distance in front and in rear of said wheel housings so as to intersect said members near their other ends, said members being adapted for connection to the ends of longitudinal leaf springs for supporting the wheels and for transmitting loads and stresses from the spring ends over the floor panel, the wheel housings and the transverse beams into a large area of adjoining parts of the body structure.

5. In an automobile body, a floor panel surrounding on three sides a cutout for the location of a rear road wheel and extending fore and aft beyond such cutout, a sill member reinforcing the margin of said floor panel in front of said cutout, a wheel housing having marginal portions secured to the margins of said floor panel defining said cutout, a cross brace extending from said sill toward the middle of the body and being forwardly spaced an appreciable distance from the front of said wheel housing, a longitudinal hollow section member extending between the inner forward corner of said wheel housing into overlapping relationship with a portion of said cross brace inwardly spaced from said sill, said member ending in front at about said cross brace and being structurally secured to said corner of the wheel housing and to said cross brace, the rear end of said member terminating at the forward corner region of the respective wheel housing and constituting attachment means for the front end of a wheel supported leaf spring.

6. In an automobile body, a floor panel surrounding on three sides a cutout for the location of a rear road wheel and extending fore and aft beyond such cutout, a sill member reinforcing the margin of said floor panel in front of said cutout, a wheel housing fitted into and secured to the margins of said floor panel defining said cutout, a forward wall portion of said wheel housing extending downwardly beyond said floor panel, a cross brace extending from said sill toward the middle of the body and being forwardly spaced from the front of said wheel housing, a longitudinal hollow section member arranged below and secured to the underside of said floor panel, said member extending between the inner forward corner of said wheel housing and a location of said cross brace inwardly spaced from said sill, said member constituting attachment means for the front end of a wheel supported leaf spring.

7. In an automobile body, a floor panel surrounding a recess for the location of a rear road wheel, a wheel housing having marginal portions secured to the margins of said floor panel defining said recess, a cross brace secured to the top of said floor and being longitudinally spaced for an appreciable distance from said wheel housing, a longitudinal hollow section member arranged on and secured to the underside of said floor panel, said member being secured to said wheel housing, ending short of the mid-region of said housing, crossing said cross brace, and terminating in the region of the latter, said member constituting attachment means for one end of a longitudinal wheel supported leaf spring.

8. In an automobile body, a plane transverse upright web, a floor panel secured to the lower margin of said web, said web extending adjacent said floor panel inwardly from a side wall of the body and being arranged near the longitudinal inboard side of a wheel location, a longitudinally extending curved wheel housing wall having its one margin at about the level of the top of the wheel housing secured to and extending longitudinally in outboard direction from said web so that said web constitutes the end wall of the wheel housing on the longitudinal inboard side thereof and the curved panel constitutes the top wall and the other end wall of the wheel housing.

9. In an automobile body, a transverse upright reinforcing web, a floor panel secured to the lower margin of said web, said web extending inwardly from a side wall of the body adjacent said floor panel and being arranged close to the longitudinal inboard side of a rear wheel location, said web being rearwardly inclined and constituting a support for the back of a rear seat, a longitudinally extending wheel housing wall having its one margin secured to and extending rearwardly from said web so that said web constitutes one end wall of the wheel housing in addition to its functions as seat back support and reinforcement.

10. In an automobile body, a pair of transverse upright webs, a floor panel, each of said webs extending inwardly from one of the side walls of the body part way to the center thereof and being arranged near the forward side of rear wheel locations, said floor panel having a wide portion in front of and a narrow portion at a higher level between the wheel locations, the rear margin of the wide portion being bent upwardly for connection to the narrow portion, said webs having their lower margins overlappingly secured to the upwardly bent margin of said wide floor panel portion, a longitudinally extending wheel housing wall on each side of the body having its one margin secured to and extending rearwardly from one of said webs so that said webs constitute the end walls of the wheel housings and together with said upwardly bent margin of the floor panel form a back support for a seat.

11. In an automobile body, a floor panel having a wide portion in front of and a narrow portion at a higher level between the locations for a pair of rear wheels, an upright floor panel portion connecting said two first-named portions, a wheel housing on each side of the body having a front wall secured to the rear margin of the wide floor panel portion and an inner wall secured to the side margin of the narrow floor panel portion, said inner wall of the wheel housing projecting downwardly beyond the narrow floor panel portion at least in its forward region, an elongated angle-formed hollow section member arranged on each side of the body adjacent the inner wheel housing wall having one arm of the angle secured to the underside of the wide floor panel portion and the other arm secured to the upright floor panel portion and the adjoining inner surface of the inner wheel housing wall, said hollow section members constituting attachment means for the forward ends of longitudinally arranged wheel supporting springs.

12. In an automobile body, a floor panel having a wide portion in front of and a narrow portion at a higher level between the locations for a pair of rear wheels, an upright floor panel portion connecting said two first-named portions, a wheel housing on each side of the body having a front wall secured to the rear margin of the wide floor panel portion and an inner wall secured to the side margin of the narrow floor panel portion, a longitudinal sill along each lateral margin of the wide floor panel portion secured by its rear end to the forward wall of the respective wheel housing, a transverse reinforcing brace secured to said floor panel forwardly spaced from said wheel housing and extending from side sill to side sill, said inner wall of the wheel housing projecting downwardly beyond the narrow floor panel portion at least in its forward region, an elongated angle-formed hollow section member arranged longitudinally on each side of the body adjacent the inner wheel housing wall having one arm of the angle secured to the underside of the wide floor panel portion and the other arm to the upright floor panel portion and the adjoining inner surface of the inner wheel housing wall, said hollow section members constituting attachment means for the forward ends of longitudinally arranged wheel supporting springs and extending forwardly to said transverse brace so as to transmit stresses thereto.

13. In an automobile body according to claim 12, having said transverse brace arranged beneath and secured to the underside of the floor panel and having the front end of said hollow section members secured to said transverse brace.

14. In an automobile body according to claim 12, having said transverse brace formed at least in part by a seat riser secured to the top of said floor panel.

ALEXANDER R. LINDSAY.

References Cited in the file of this patent

UNITED STATES PATENTS

| Number | Name | Date |
|---|---|---|
| 1,525,936 | Heintz | Feb. 10, 1925 |
| 1,608,228 | Parke et al. | Nov. 23, 1926 |
| 1,629,278 | Lambert | May 17, 1927 |
| 2,234,221 | Avery et al. | Mar. 11, 1941 |
| 2,240,022 | Saives | Apr. 29, 1941 |
| 2,248,319 | Waterhouse, Jr. | July 8, 1941 |
| 2,278,450 | Jones | Apr. 7, 1942 |
| 2,292,646 | McIntosh et al. | Aug. 11, 1942 |
| 2,297,198 | Borgward | Sept. 29, 1942 |
| 2,306,416 | Waterhouse, Jr. | Dec. 29, 1942 |

FOREIGN PATENTS

| Number | Country | Date |
|---|---|---|
| 548,589 | Germany | Apr. 14, 1932 |
| 572,240 | Great Britain | Sept. 28, 1945 |
| 773,590 | France | Sept. 3, 1934 |
| 940,939 | France | June 14, 1948 |